(12) United States Patent
Byrne et al.

(10) Patent No.: US 7,610,507 B2
(45) Date of Patent: *Oct. 27, 2009

(54) HIGH-SPEED REDUNDANT DISK CONTROLLER METHODS AND SYSTEMS

(75) Inventors: Richard J. Byrne, Hillsborough, NJ (US); Silvester Tjandra, Singapore (SG); Eu Gene Goh, Singapore (SG)

(73) Assignee: Agere Systems Inc., Allentown, PA (US)

( * ) Notice: Subject to any disclaimer, the term of this patent is extended or adjusted under 35 U.S.C. 154(b) by 297 days.

This patent is subject to a terminal disclaimer.

(21) Appl. No.: 11/518,544

(22) Filed: Sep. 8, 2006

(65) Prior Publication Data

US 2008/0065930 A1 Mar. 13, 2008

(51) Int. Cl.
*G06F 11/00* (2006.01)
(52) U.S. Cl. .......................................................... 714/6
(58) Field of Classification Search ........................ 714/6
See application file for complete search history.

(56) References Cited

U.S. PATENT DOCUMENTS

| | | | | |
|---|---|---|---|---|
| 5,469,548 A * | 11/1995 | Callison et al. | ............. | 711/114 |
| 5,708,769 A * | 1/1998 | Stallmo | ........................... | 714/6 |
| 5,721,823 A * | 2/1998 | Chen et al. | .................... | 709/203 |
| 5,761,526 A * | 6/1998 | Sakakura et al. | ................ | 710/1 |
| 5,954,822 A * | 9/1999 | Yashiro et al. | .................. | 714/6 |
| 6,237,052 B1 * | 5/2001 | Stolowitz | ....................... | 710/61 |
| 6,298,415 B1 * | 10/2001 | Riedle | ........................ | 711/114 |
| 7,526,606 B2 * | 4/2009 | Byrne et al. | .................. | 711/114 |
| 2002/0083111 A1 * | 6/2002 | Row et al. | ........................ | 709/1 |
| 2002/0094195 A1 * | 7/2002 | Bopardikar et al. | ........... | 386/122 |
| 2003/0105829 A1 * | 6/2003 | Hayward | ....................... | 709/214 |
| 2005/0223269 A1 * | 10/2005 | Stolowitz | ........................ | 714/6 |

* cited by examiner

*Primary Examiner*—Scott T Baderman
*Assistant Examiner*—Yair Leibovich (57) ABSTRACT

Various apparatus and methods for controlling data for a redundant array of inexpensive/independent disks (RAID) are presented. For example, in one illustrative embodiment, a controlling apparatus can include a translation device composed substantially entirely of gate-level electronic hardware, wherein the translation device includes a sector sequencer capable of arranging sector units of target data and parity data on a plurality of N disks as a function of block location.

17 Claims, 6 Drawing Sheets

CONVENTIONAL                  MODIFIED

HIGH-SPEED REDUNDANT DISK CONTROLLER METHODS AND SYSTEMS

BACKGROUND

In the data storage arts, the term "RAID" stands for a "redundant array of inexpensive disks" (or alternatively a "redundant array of independent disks") and refers to a system that uses multiple hard drives to share or replicate data. In its original implementations, the key advantage to a RAID system was the ability to combine multiple low-cost devices using older technology into a storage disk array that offered greater performance than what was affordably available in a single device using the newest technology. Depending on the RAID version chosen, the benefits of RAID systems include (as compared to single drives) one or more of increased data integrity, fault-tolerance, throughput and capacity.

A RAID system is typically used on server computers, and is usually (but not necessarily) implemented with identically-sized disks. However, with decreases in hard drive prices and wider availability of RAID options built into motherboard chipsets, RAID is also being found and offered as an option in more advanced personal computers. This is especially true in computers dedicated to storage-intensive tasks, such as video and audio editing.

Two particular RAID levels of interest, known as RAID 4 and RAID 5, operate by distributing data over a plurality of disk with redundant parity information assigned to a single disk (RAID 4) or distributed among the various disks (RAID 5). Some of the primary advantages to RAID 4 and RAID 5 systems are that large amounts of data can be quickly off-loaded to external devices while the failure of a single disk could be handled albeit with some performance degradation.

Unfortunately, when a disk does fail in a RAID 4 or RAID 5 system, it is necessary to replace the failed disk and reconstruct the lost data using the remaining disks, a task that can be very difficult if the RAID is busy delivering large amounts of data over long periods of time, and very important as the loss of another disk in the interim would mean a loss of all of the data on the RAID system. Further, present RAID 4 and RAID 5 systems are not well suited for high-speed streaming data, especially in the event of a failure. Thus, new technology related to improving RAID performance is desirable.

SUMMARY

In an illustrative embodiment, an apparatus for controlling data for a redundant array of inexpensive/independent disks (RAID) includes a translation device composed substantially entirely of gate-level electronic hardware, wherein the translation device includes a sector sequencer capable of arranging sector units of target data and parity data on a plurality of N disks as a function of block location.

In another embodiment, an apparatus for controlling data for a redundant array of inexpensive/independent disks (RAID) includes a translation device that includes a sector sequencer capable of arranging sector units of target data and parity data on a plurality of N disks as a function of block location, and a ping-pong buffer coupled to the translation device capable of uploading data from, and downloading data to, the N disks.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the example embodiments. Such methods and apparatus are clearly within the scope of the present teachings.

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

The various advantages offered by the disclosed methods and systems include providing an improved RAID controller that is not only less expensive but that offers a performance increase of several times that of known RAID systems. For example, an eight (8)-disk RAID 5 system using an exemplary controller can not only simultaneously provide eight separate MPEG data streams to the outside world, but the effects of a single disk failure is typically limited to less than a few milliseconds of interrupted data, after which the RAID system will perform as before. Further, upon replacement of the failed disk, the exemplary RAID controller can perform data reconstruction on the replacement disk again without interrupting the eight outbound MPEG data streams. Accordingly, while the disclosed RAID systems can be used for practically any use, their advantages are particularly prominent when used to store and retrieve streaming data such as MPEG data, other video data, music, animations, background scenes for games and so on.

For the purpose of this disclosure the term "block stripe" (and its derivatives) shall refer to its commonly known meaning in the RAID storage arts as a data structure having multiples segments spanning multiple disks.

Further the term "sector stripe" shall refer to a data structure of related data being of one sector in depth and spanning multiple disks. See, FIG. 2 for examples of sector stripes S1, S2 and S3.

Still further, the term "target data" shall refer to some data content to be received from an external source and stored and/or stored to be delivered to an external device, such as an MPEG data stream. Target data does not by itself generally affect the operation of a disk.

Also, the term "parity data" shall refer to its commonly known meaning in the RAID storage arts as the XOR product of multiple bytes, segments, blocks and so on.

Figure 1:
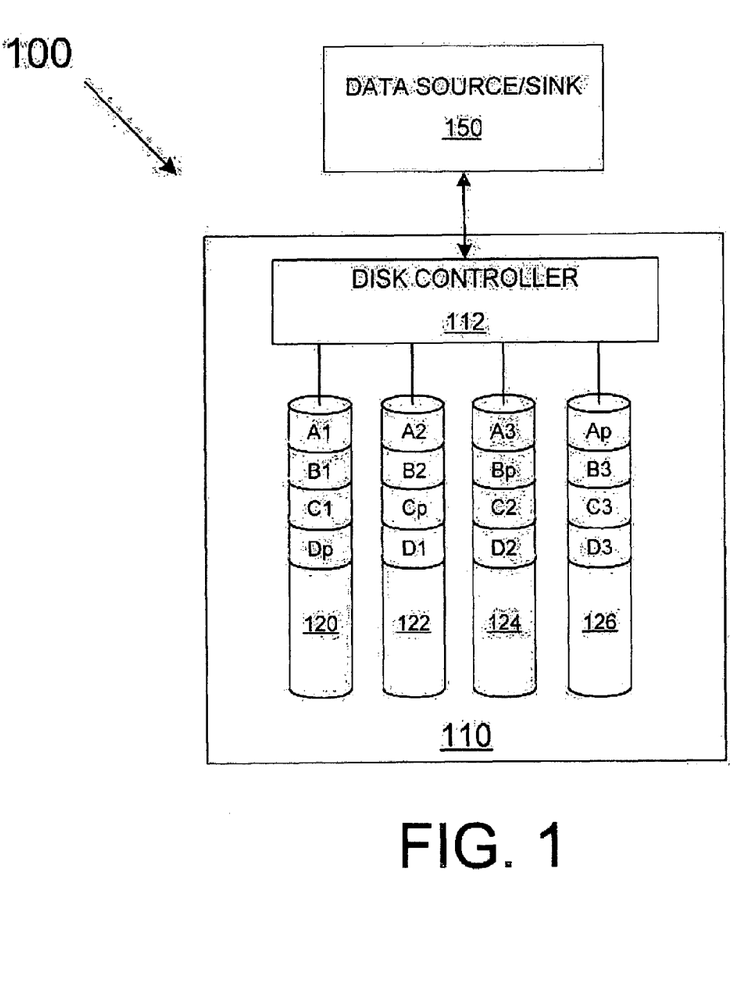
FIG. 1 is an exemplary system using a RAID storage system in accordance with an illustrative embodiment.
Figure 2:
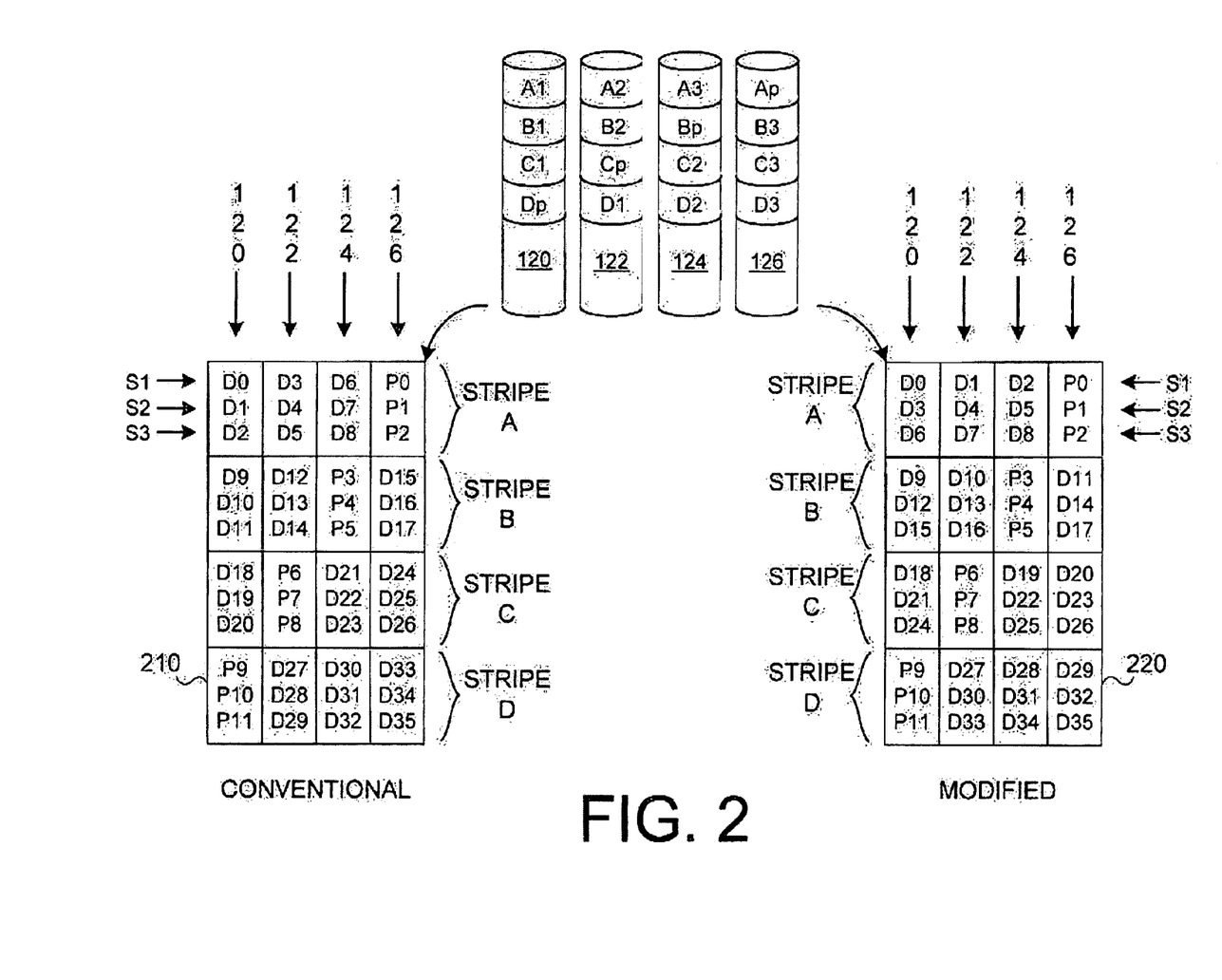
FIG. 2 depicts data storage on both a known RAID system as well as on an improved RAID system according to an illustrative embodiment.

FIG. 1 is an exemplary system 100 using RAID-based storage technology. As shown in FIG. 2, the exemplary system 100 includes a data source/sink 150 coupled to a RAID storage system 110. The exemplary RAID storage system 110, in turn, includes four hard disks 120-126 controlled by a common disk controller 112.

In a first mode of operation, the data source/sink 110 can provide target data to the RAID storage system 110 upon which the disk controller 112 can receive the data and divide the received data into separate blocks. In the present embodiment where four disks 120-126 are used, a parity sector is generated for every three target data sectors in a block to produce a separate "stripe" of four sectors. Then each stripe of sectors is used to form part of a stripe of blocks stored in the various disks 120-126. Depending on whether a RAID 4 or a RAID 5 system is specified, the disk controller 112 will store the parity blocks on a single disk 120-122, 124 or 126 or distribute the parity blocks among the four disks 120-126.

The exemplary disk controller 112 can store data in the disks 120-126 according to a modified format (compared to known RAID systems) that can increase data throughput while decreasing internal memory requirements.

For example, FIG. 2 depicts the differences between the way data is stored in a known RAID system 210 as compared to the modified RAID storage format used in an exemplary RAID system 220. As shown in FIG. 2, for both systems 210 and 220, each stripe of blocks consists of nine (9) target data sectors and three (3) parity data sectors. Also, as the exemplary two systems 210 and 220 are representative of RAID 5 architecture, the various parity sectors P0-P11 are distributed/rotated among the four disks 120-126 as a function of block address/location.

As also shown in FIG. 2 (on the bottom left) for the known storage system 210, the nine target data sectors D0-D8 of block stripe A are organized in groups of contiguous data {D0,D1,D2}, {D3,D4,D5} and {D6,D7,D8} respectively located on disks 120, 122 and 124 with disk 126 containing parity data sectors {P0, P1, P2}. A similar organization is shown for block stripes B, C and D with parity data shifting to disks 124, 122 and 120 respectively. The consequence of this data organizations is that while data is contiguous on a per-disk basis, the data is non-contiguous for any given sector stripe.

For example, the three sector stripes S1, S2 and S3 of block stripe A data are arranged in groups having non-contiguous target data sectors {D0,D3,D6,P0}, {D1,D4,D7,P1} and {D2,D5,D8,P2} with parity sector P0 being derived by non-contiguous data sectors D0, D4 and D7, parity sector P1 being derived by non-contiguous data sectors D1, D5 and D8, and parity sector P2 being derived by non-contiguous data sectors D2, D6 and D9. Similar consequences are found for block stripes B, C and D.

In contrast to the storage technique used for known RAID 4 and RAID 5 systems, the modified storage system 220 (bottom right) organizes data non-contiguously along disk boundaries but contiguously along the sector stripes. Accordingly, sector stripes S1, S2 and S3 are grouped into contiguous target data sectors {D0,D1,D2,P0}, {D3,D4,D5,P1} and {D6,D7,D8,P2} respectively. Further, parity sector P0 is derived from contiguous data sectors D0-D2, parity sector P1 is derived from contiguous data sectors D3-D5, and parity sector P2 is derived from contiguous data sectors D6-D8.

The format of the modified system 220 gives rise to several advantages. The first advantage is that contiguous data can be read faster from the disks 120-126 in smaller increments while still checking parity. That is, in order to read contiguous data sectors D0-D2, a RAID controller may take three times the amount of time using the known system 210 as with the modified system.

Further, for situations where all nine data sectors D0-D8 must be provided in their natural order (e.g., for certain high-speed applications, such as providing MPEG streams), contiguous data sectors can be extracted using a memory buffer having one-third the size of known systems by serially uploading stripes S1, S2 and S3—one at a time—before forwarding the data off system.

Still further, data uploading and reconstruction after a disk failure may be simultaneously performed a sector stripe at a time with little or no impact on data delivery performance, and parity information may be more easily derived.

Returning to FIG. 1, in a second mode of operation the RAID storage system 110 can upload target data from its disks 120-126, and deliver the uploaded data to the data source/sink 150. In this retrieval/read mode, the disk controller 112, after receiving a data retrieval/read request from the data source/sink 150, can direct the various disks 120-126 to simultaneously recall the requested data from the appropriate sector stripes on the disks 120-126. Again, referring to FIG. 2, given that the position of a parity sector may vary as a function of block number/position the disk controller 112 may need to determine which disk 120-126 contains parity information, and either upload only the target data-bearing sectors (one sector stripe at a time) or optionally upload the entire sector stripe including parity data.

Depending on the embodiment, the disk controller 112 can store both target data and parity data in a block of RAM, then perform a parity check from the RAM. The parity check results for each sector stripe can then be forwarded to the source/sink 150.

Alternatively, the disk controller 112 can forego any parity check and simply provide the target data to the source/sink 150.

In addition to the standard read mode described above, the exemplary disk controller 112 can use an alternative read mode, sometimes referred to as the "degraded mode" of a RAID system. In the degraded mode, one of the disks 120-126 is assumed to have failed. However, because of the redundant information provided by the parity sectors, the data of each sector stripe can be faithfully reconstructed, and the reconstructed data can be forwarded to the data source/sink 150 along with the target data.

It should be appreciated that in a RAID 4 or RAID 5 system, the degraded mode and/or the rebuilding time necessary to recreate data onto a replacement disk is considered the window at which the RAID array is most vulnerable to data loss. During this time, if a second disk failure occurs, data is unrecoverable.

Known RAID controlling systems typically use some form of software solution to handle degraded operational modes or rebuilding—either relying on the host processor of a server or personal computer or a special embedded processor on a "hardware solution" board, to perform data reconstruction.

In contrast, the exemplary RAID processor 112 takes a gate-level hardware approach to reconstructing lost data. Because of the gate-level solution, data reconstruction can take literally but a few clock cycles, as opposed to the hundreds of clock cycles for software approaches or pseudo-hardware (i.e., embedded processor) approaches.

Because of the gate-level hardware approach to data reconstruction, the disk controller 112 suffers little or no appreciable loss of performance due to a disk failure due to the negligible added overhead. This approach not only allows the correct data to be passed to the data source/sink 150, but also allows the disk controller 112 to reconstruct data on a failed disk while simultaneously providing target data to the outside world.

Further, because of the lower memory requirements due to the use of contiguous data sector stripes, overall costs of the added gate-level parity checking are balanced with the lowered costs of using smaller memory buffers.

Figure 3:
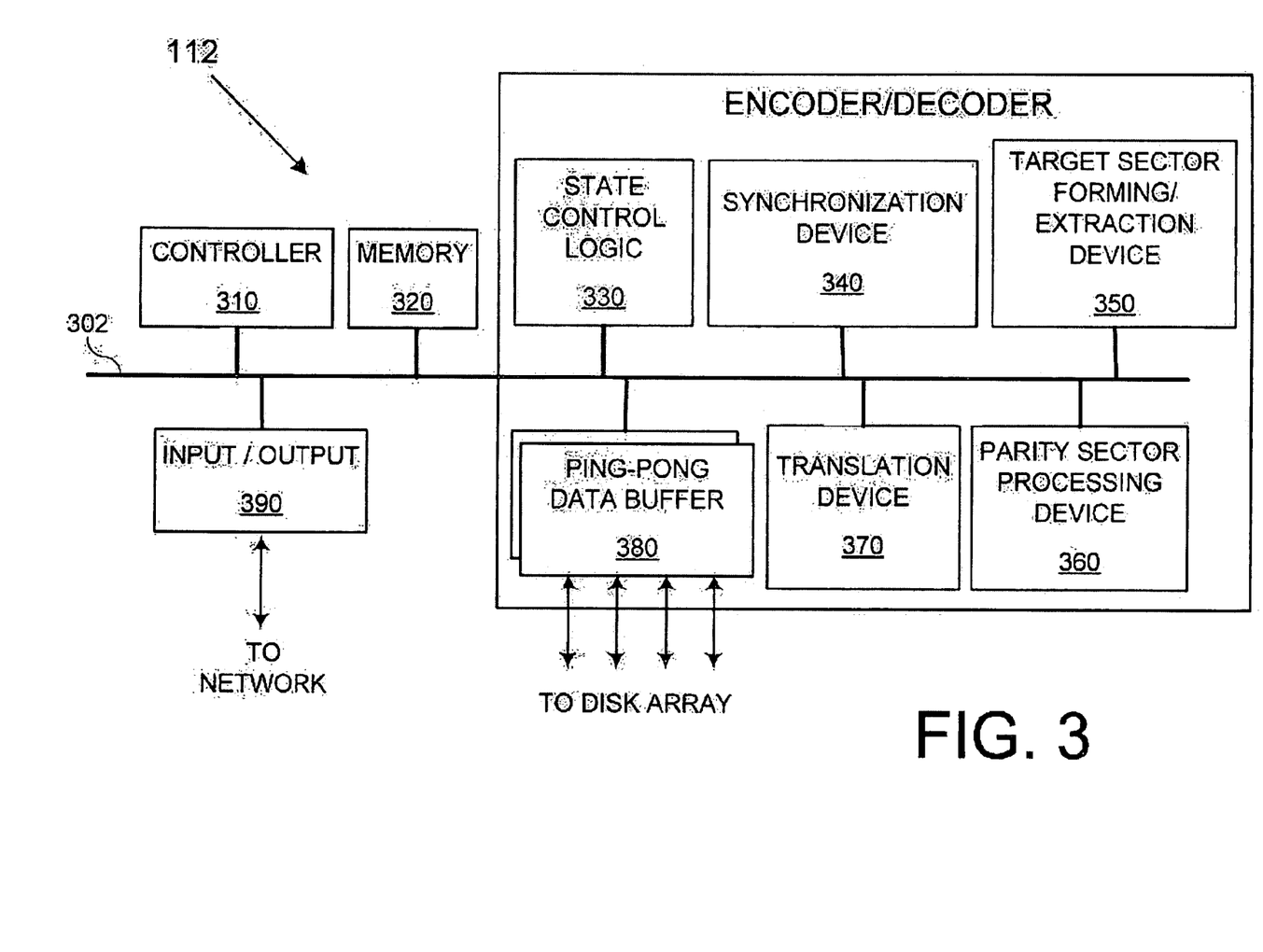
FIG. 3 is a portion of an exemplary RAID controller according to an illustrative embodiment.

FIG. 3 is a portion of an exemplary RAID disk controller 112 according to the present disclosure capable of controlling a RAID array of N disks. As shown in FIG. 3, the RAID disk controller 112 includes a controller 310, a memory 320, state control logic 330, a synchronization device 340, a target data sector forming/extraction device 350, a parity sector processing device 360, a translation device 370, a ping-pong data buffer 380 and an input/output device 390.

Although the exemplary RAID disk controller 112 of FIG. 3 uses a bussed architecture, it should be appreciated that any other architecture may be used as is well known to those of ordinary skill in the art. For example, in various embodiments, the various components 310-390 can take the form of separate electronic components coupled together via a series of separate busses, or alternatively a collection of dedicated logic arranged in a highly specialized architecture and implemented with gate-level logic.

It also should be appreciated that some of the above-listed components 330-370 can take the form of software/firmware routines residing in memory 320 and be capable of being executed by the controller 310, or even software/firmware routines residing in separate memories in separate servers/computers being executed by different controllers.

Returning to FIG. 3, components 330-380 can be conceptually grouped into what can be referred to as an "encoder/decoder", i.e., a device that organizes data on a collection of RAID disks. While in various embodiments an encoder/decoder may be an amalgam of nearly endless combinations of hardware and software, it should be appreciated that, as discussed above, by implementing key portions of the exemplary translator as gate-level hardware solutions, performance can be greatly improved.

In operation and under control of the state control logic 330, the synchronization device 340 can start and synchronize the N number of disks controlled by the disk controller 112.

For incoming target data to be written onto the disks, the target sector forming/extraction device 350 can receive the target data from the input/output device 390, and break the target data into contiguous portions that could be accommodated by (N-1) sectors. Again as noted above, when insufficient target data is available, some sectors may be padded with zeros. The target sector forming/extraction device 350 may also add header information, checksums and other information to each sector as may be necessary or desired. Note that the target sectors can be formed and modified in one of the ping-pong data buffers 380.

Simultaneously, the translation device 370 can determine where the current target data sectors formed by the target sector forming/extraction device 350 are to be written within the RAID systems' disks, and which of the N disk should contain parity information.

Using the N-1 sectors of data formed by the target sector forming/extraction device 350, the parity sector processing device 360 can generate a complementary parity sector. For the present embodiment, the parity sector processing device 360 is implemented with gate-level hardware such that the parity sector can be generated in as little as a single clock cycle, which represents significant performance improvement over known systems. As with the target data sectors, each parity sector may be calculated 'on the fly' from the Data Sector's passing through the encoder sector unit buffer. Notably, the encoder and decoder can operate simultaneously.

Once all sectors of a sector stripe are appropriately formed in one of the ping-pong data buffers 380, the translation device 370 can cause the appropriate ping-pong data buffer 380 to deliver the sector stripe of data to the N disks for simultaneous storage.

By repeating the various processes described above, the various components 330-380 of the encoder/decoder can form a pattern of sector stripes consistent with the sector layout shown in FIG. 2.

While read operations are obviously quite different from write operations, the same general components 330-380 can nonetheless be used. During a read operation, the state control logic 330 can cause the translation device 370 to determine the block stripe and sector stripe locations of some data of interest. Subsequently, the state control logic 330 can cause the ping-pong data buffers 380 to load the appropriate sector stripes one after the other. After each sector stripe is fully uploaded, the parity sector processing device can perform a parity check to determine data integrity while the target data forming/extraction device 350 can extract the target data, which can be offloaded to an intended location via the input/output device 390.

In situations where a sector is determined to hold bad data (e.g., via a bad checksum or a failure status flag from one of the N drives), the exemplary encoder/decoder can employ the parity sector processing device 360 to reconstruct either the missing target data or parity data. The target data could then be offloaded. Should a replacement disk be provided for the failed disk, reconstructed data sectors could be written to the replacement disk even in situations where multiple streams of data are being uploaded and delivered to an external device.

Figure 4:
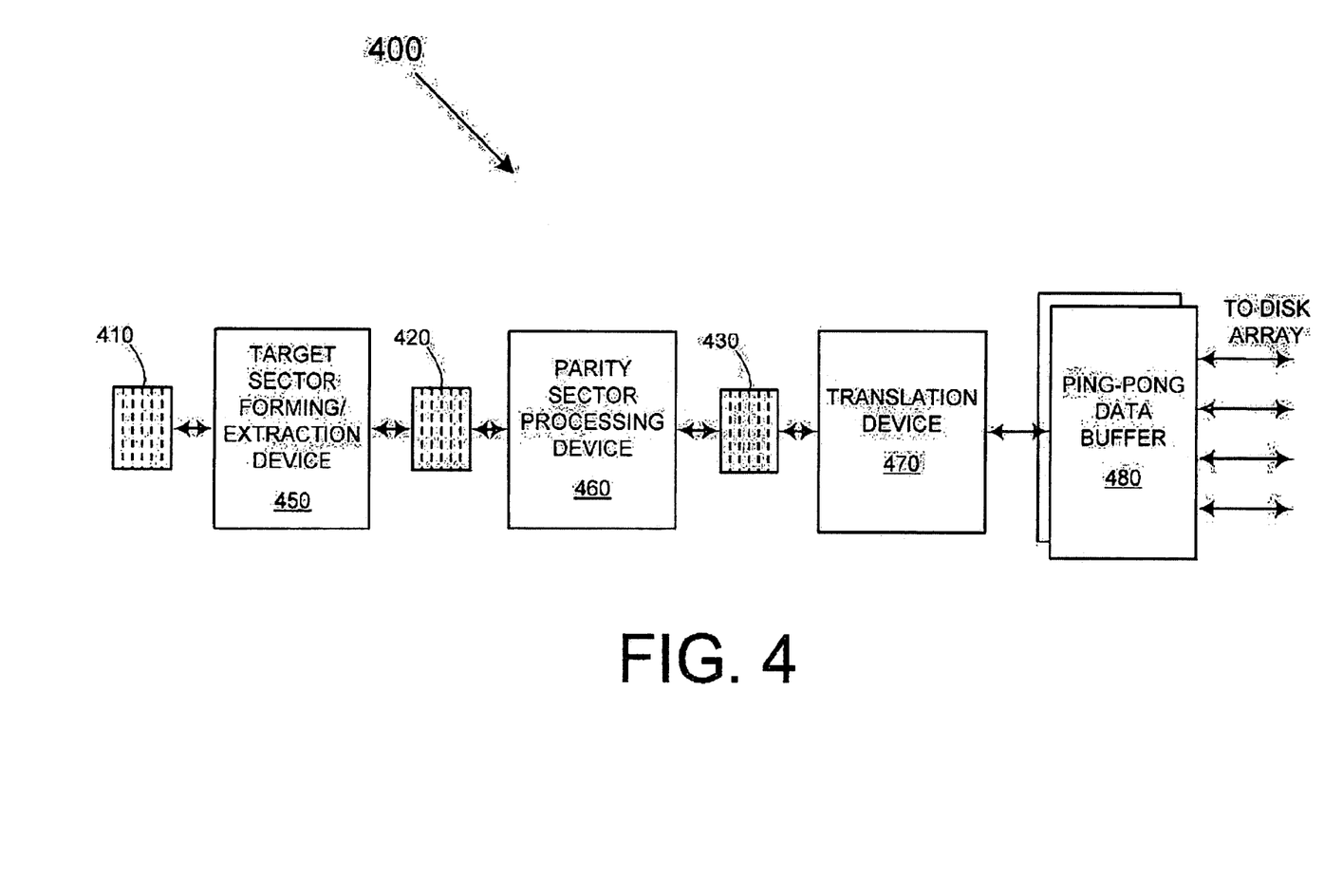
FIG. 4 is a portion of a second exemplary RAID controller according to an illustrative embodiment.

FIG. 4 is a portion of a second exemplary RAID controller 400 according to the present disclosure. As shown in FIG. 4, the second exemplary RAID controller 400 includes a target data sector forming/extraction device 450, a parity sector processing device 460, a translation device 470, a ping-pong data buffer 480 and a first, second and third FIFO buffers 410-430.

For the present embodiment, the target data sector forming/extraction device 450, parity sector processing device 460, translation device 470, and ping-pong data buffer 480 have the same general functions as their counterparts 350-380 in FIG. 3 although their internal structure may deviate and the exact way upon which they manipulate data may vary.

The second exemplary RAID controller 400 represents a gate-level hardware solution capable of increasing performance by orders of magnitude over competing devices while using a total gate-count that may be less than many software-based processors tasked to do the same functions.

In a disk write operation, the first FIFO buffer 410 can receive a stream of target data from an external source, and deliver the target data to the target data sector forming/extraction device 450. In turn, the target data sector forming/extraction device 450 can break the data into discrete units ("target data sector units") of a size designed to accommodate individual sectors (or alternatively individual sector stripes) of the intended storage disks. As the target data sector units are formed, they can be delivered to the parity sector processing device 460 as a stream of sector units via FIFO buffer 420.

In turn, the parity sector processing device 460 can receive the target data sector units and generate a "parity sector data unit", i.e., a sector's worth of parity data, for every N-1 target data sector units. For the present embodiment, the parity data sector units are inserted into the stream of target data sector units to create a stream of "sector stripe units" which can be defined as the combination of target data and parity data that can be stored in a sector stripe of the present disclosure, such as the sector stripes shown in FIG. 2 on the lower right-hand side. Note however, that in other embodiments the parity data sector units do not need to be combined with the target data sector units but may be delivered to other devices separately via another FIFO or other communication device.

As the sector stripe units (or equivalent data structures) are formed, they can be delivered to the translation device 470, which can "shuffle" the various target and parity data sector units of a sector stripe unit into their appropriate positions, based on block address/location, into one of the ping-pong data buffers 480, which can then deliver the sector stripe units to the N disks for simultaneous storage.

Figure 5:
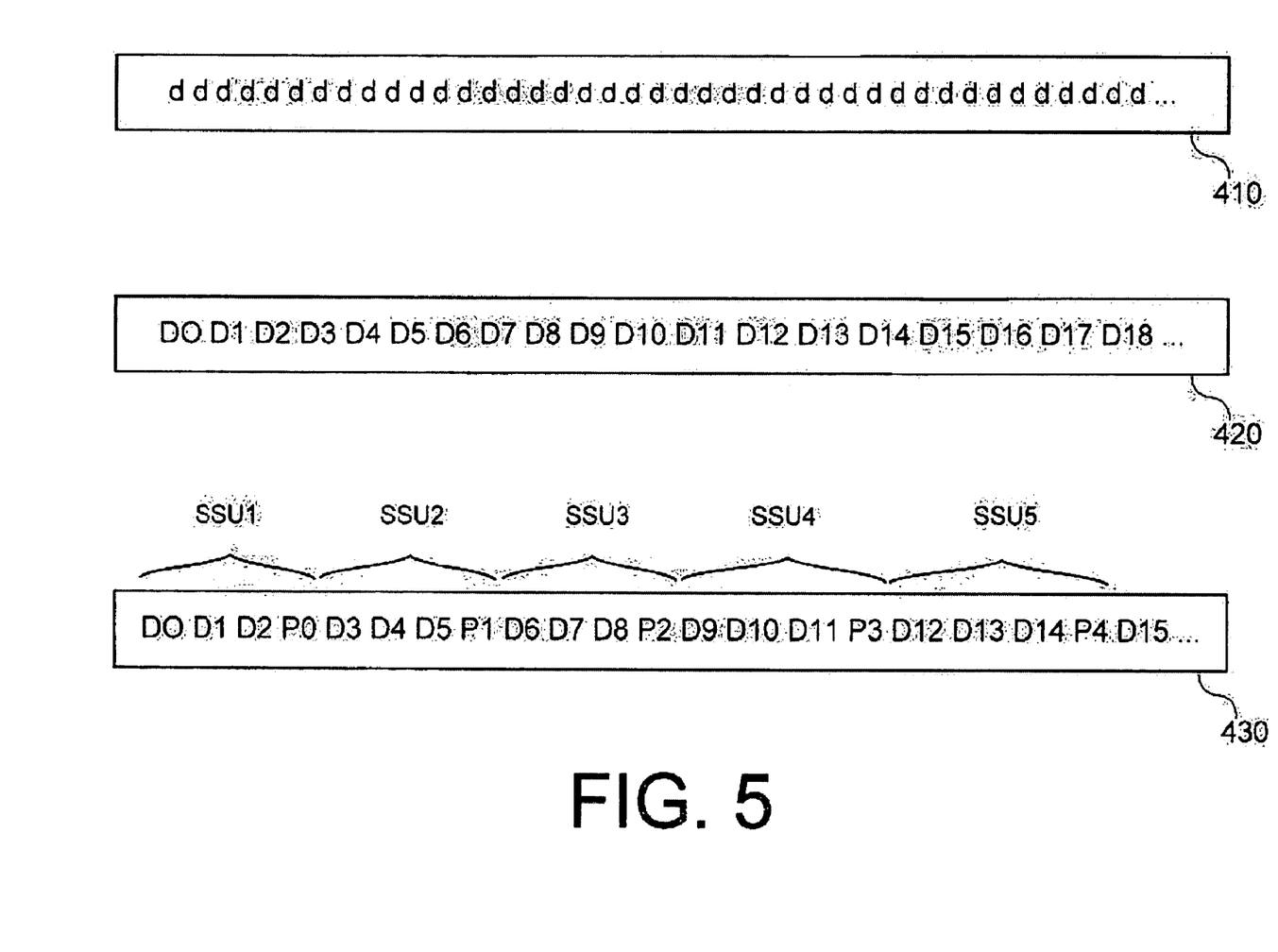
FIG. 5 depicts the evolving data structures of the second exemplary RAID controller of FIG. 4.

FIG. 5 depicts the various stages of data in the FIFO buffers 410, 420 and 430 of FIG. 4 presented for a more clear understanding of the functionality of the various components 450-480 of FIG. 4. As shown in FIG. 5, the first FIFO buffer 410 is depicted as having carrying raw target data {d d d d d . . . } while FIFO buffer 420 is depicted as carrying target data sector units {D0 D1 D2 D3 D4 . . . } with each target data sector unit being composed of multiple bytes (typically 512 bytes) of raw target data. Further note that the third FIFO buffer 430 is carrying target data sector units interleaved with parity data sector units {D0 D1 D2 P0 D3 D4 . . . } to form a stream of sector stripe units {SSU1 SSU2 SSU3 . . . }.

Returning to FIG. 4, as with write operations, the various functional components 450-480 are capable of performing analogous read operations of their counterparts 350-360 of FIG. 3, and the FIFOs 410-430 are capable of conveying data in the opposite direction (right to left). Also note that during normal read operations, the general data structure of the FIFO buffers 410-430 can look identical to that of FIG. 5.

Further note that during a degraded mode read operation, data in the third FIFO buffer 430 may vary in content given one of every N sector units is expected to be corrupted, but due to the data reconstruction capacity of the parity sector processing device 460, data in the other FIFOs 420 and 410 should be unaffected.

Figure 6:
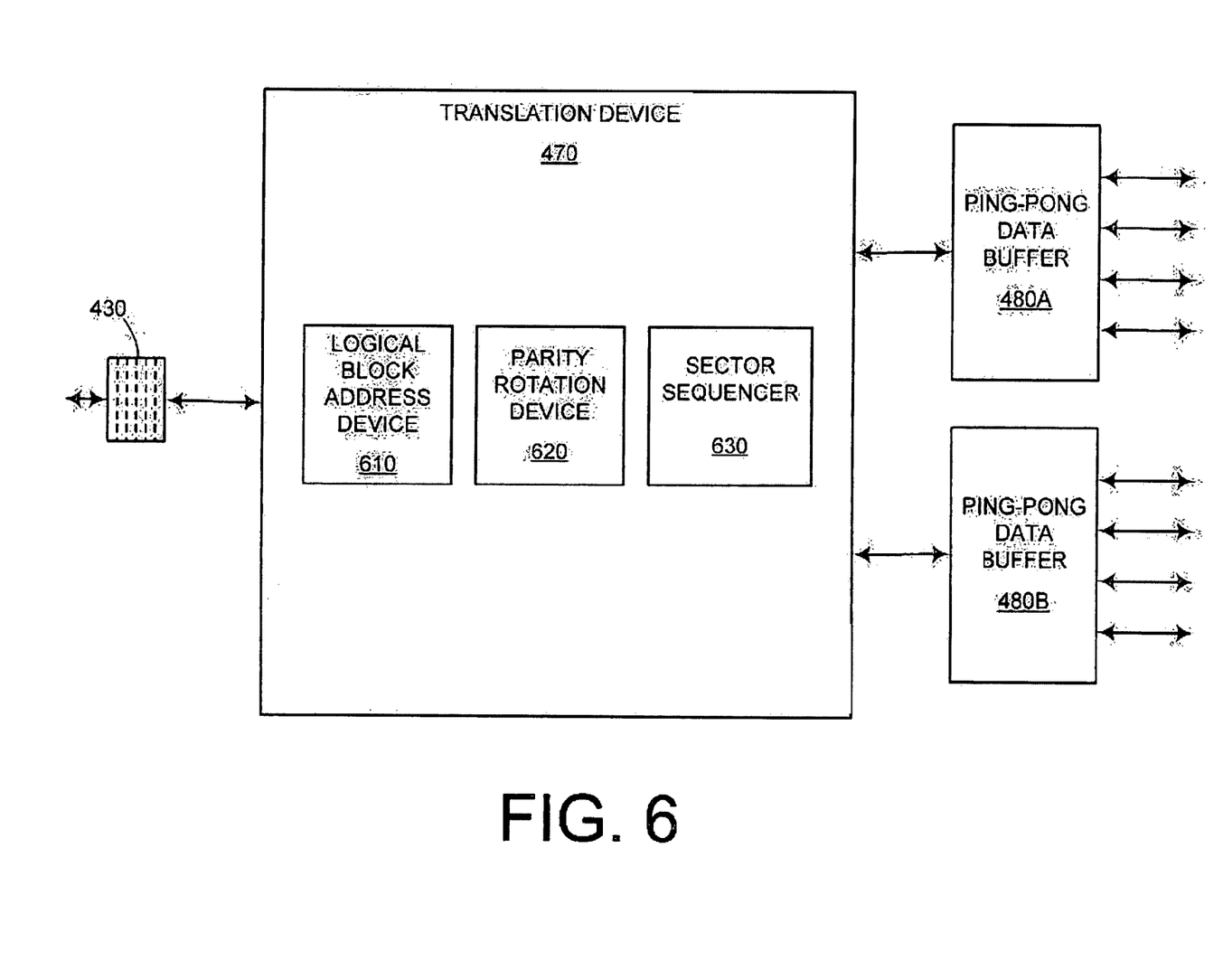
FIG. 6 depicts a portion of the exemplary RAID controller of FIG. 4.

Continuing to FIG. 6, details of the translation device 470 of the exemplary RAID controller of FIG. 4 are depicted. As shown in FIG. 6, the translation device 470 includes a logical block address device 610, a parity rotation device 620 and a sector sequencer 630, while the ping-pong buffer 480 is depicted in its constituent parts 480a and 480B.

In operation, the logical block address device 610 is responsible for determining the logical address/location of a block stripe of interest. For example, if it is desired to read a "chunk" of 300 blocks located in the middle of each of the N disks, the logical block address device 610 is responsible for tracking the logical address/location of each block read, and provide this information to the parity rotation device 620.

Using the block location information provided by the block address device 610, the parity rotation device 620 can determine which of the N disks for a given block is reserved for parity data, and provide this information to the sector sequencer 630.

In turn, the sector sequencer 630 can arrange the various target and parity data sector units to the N disks in one of the ping pong buffers 480A or 480B when writing, or alternatively change/unshuffle the target and parity sector data units while reading. Note that in various embodiments, it can be advantageous to allow one of the ping-pong buffers 480A or 480B to upload or download data from/to the N disks while the sector sequencer is operating on the other ping-pong buffer 480A or 480B.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

The many features and advantages of the present teachings are apparent from the detailed specification, and thus, it is intended by the appended claims to cover all such features and advantages of the present teachings which fall within the true spirit and scope of the present teachings. Further, since numerous modifications and variations will readily occur to those skilled in the art, it is not desired to limit the present teachings to the exact construction and operation illustrated and described, and accordingly, all suitable modifications and equivalents may be resorted to, falling within the scope of the present teachings.

The invention claimed is:

1. An apparatus for controlling data for a redundant array of inexpensive/independent disks (RAID), comprising:
   a translation device composed substantially entirely of gate-level electronic hardware, wherein the translation device includes a sector sequencer capable of arranging sector units of target data and parity data on a plurality of N disks as a function of block locations,
   wherein the data of the N disks has a format comprising a sequence of block stripes with each block stripe containing one or more sector stripes, and wherein each sector stripe is formatted such that N-1 of the sectors contain contiguous target data and the remaining sector contains parity data for the other N-1 sectors.

2. An apparatus of claim 1, wherein the translation device further comprises:
   a logical block address device capable of identifying block stripe locations; and a parity rotation device capable of determining for a particular sector stripe which of the plurality of N disks is reserved for parity data.

3. The apparatus of claim 1, wherein each block stripe contains a plurality of sector stripes.

4. The apparatus of claim 1, further comprising a ping-pong buffer communicatively coupled to the translation device capable of uploading data from, and downloading data to, the N disks.

5. The apparatus of claim 4, wherein the ping-pong buffer has a first portion and a second portion, and wherein the first portion is capable of downloading data to the N disks while the translation device stores data in the second portion.

6. The apparatus of claim 4, further comprising one or more FIFO buffers coupled to the translation device capable of delivering a stream of target and parity sector units to the translation device.

7. The apparatus of claim 4, further comprising a first FIFO buffer coupled to the translation device capable of delivering a stream of target and parity sector units to the translation device.

8. The apparatus of claim 7, wherein the first FIFO buffer is coupled to a parity error processing device capable of determining whether a read sector stripe has a parity error.

9. The apparatus of claim 7, wherein the first FIFO buffer is coupled to a parity error processing device capable of generating the parity sector units.

10. The apparatus of claim 7, wherein each portion of the ping-pong buffer contains enough memory to hold a sector stripe, but not enough memory to hold a block stripe.

11. An apparatus for controlling data for a redundant array of inexpensive/independent disks (RAID), comprising:
   a translation device that includes a sector sequencer capable of arranging sector units of target data and parity data on a plurality of N disks as a function of block location; and
   a ping-pong buffer communicatively coupled to the translation device capable of uploading data from, and downloading data to, the N disks,
   wherein the data of the N disks has a format comprising a sequence of block stripes with each block stripe containing one or more sector stripes, and wherein each sector stripe is formatted such that N-1 of the sectors contain contiguous target data and the remaining sector contains parity data for the other N-1 sectors.

12. The apparatus of claim 11, further comprising one or more FIFO buffers coupled to the translation device capable of delivering one or more streams of target data and parity data sector units to the translation device.

13. The apparatus of claim 11, further comprising a first FIFO buffer coupled to the translation device capable of delivering a stream of target data and parity data sector units to the translation device.

14. An apparatus of claim 11, wherein the translation device further comprises:
   a logical block address device capable of identifying block stripe locations; and
   a parity rotation device capable of determining for a particular sector stripe which of the plurality of N disks contains parity data.

15. An apparatus of claim 14, wherein the sector sequencer arranges sector units of target data and parity data as a function of information from the parity rotation device.

16. The apparatus of claim 11, wherein each block stripe contains a plurality of sector stripes.

17. The apparatus of claim 16, wherein each sector contains multiple bytes of data.

\* \* \* \* \*